United States Patent
Sokolov et al.

(10) Patent No.: US 10,237,304 B1
(45) Date of Patent: Mar. 19, 2019

(54) SYSTEMS AND METHODS OF ADMINISTERING COMPUTER ACTIVITIES BASED UPON EMOTIONAL INTELLIGENCE

(71) Applicant: Symantec Corporation, Mountain View, CA (US)

(72) Inventors: Ilya Sokolov, Boston, MA (US); Keith Newstadt, West Newton, MA (US)

(73) Assignee: SYMANTEC CORPORATION, Mountain View, CA (US)

( * ) Notice: Subject to any disclaimer, the term of this patent is extended or adjusted under 35 U.S.C. 154(b) by 272 days.

(21) Appl. No.: 15/227,217

(22) Filed: Aug. 3, 2016

(51) Int. Cl.
*H04L 29/06* (2006.01)
*H04L 29/08* (2006.01)
*G06F 17/30* (2006.01)
*G06F 3/01* (2006.01)

(52) U.S. Cl.
CPC .............. *H04L 63/20* (2013.01); *G06F 3/013* (2013.01); *G06F 17/30528* (2013.01); *G06F 17/30598* (2013.01); *H04L 67/22* (2013.01)

(58) Field of Classification Search
CPC ...................................................... H04L 63/20
See application file for complete search history.

(56) References Cited

U.S. PATENT DOCUMENTS

| | | | | |
|---|---|---|---|---|
| 9,465,368 | B1* | 10/2016 | Mitter | G06F 21/316 |
| 9,692,839 | B2* | 6/2017 | Davis | H04L 67/22 |
| 9,953,029 | B2* | 4/2018 | Baughman | G06F 17/2818 |
| 9,959,694 | B2* | 5/2018 | Lindsay | G07F 7/1025 |
| 2008/0181408 | A1* | 7/2008 | Hird | G06F 21/62 |
| | | | | 380/277 |
| 2008/0229400 | A1* | 9/2008 | Burke | G06F 21/32 |
| | | | | 726/7 |
| 2009/0018407 | A1* | 1/2009 | Jung | A61B 3/113 |
| | | | | 600/301 |

(Continued)

OTHER PUBLICATIONS

Pugh, John; "New technology monitors autonomic nervous system, identifying changes and soothing its wearer." http://www.psfk.com/2012/10/watch-relieves-stress.html. PSFK, Oct. 28, 2012.

(Continued)

*Primary Examiner* — Simon P Kanaan
(74) *Attorney, Agent, or Firm* — Maschoff Brennan

(57) ABSTRACT

Systems and methods of administering computer activities based upon user emotional intelligence are provided. One method may include receiving a user request for a computer activity and sensing emotional context data associated with the user, such as voice stress analysis of use a communication, eye motion, pupil dilation, mood and stress changes, sporadic user movement, and video contexts indicating micro-expressions (i.e. anxiety, anger, amusement, and the like). The method may further include retrieving a policy associated with the requested computer activity and applying the sensed emotional context data to the policy. In response to policy permission, the system may enable full or restricted access to the requested computer activity based upon the sensed emotional context. In the alternative, in response to policy violation, the system may deny access to the computer activity. The system may solicit feedback such that parental or third party controls may be established using emotional intelligence.

20 Claims, 5 Drawing Sheets

(56) References Cited

U.S. PATENT DOCUMENTS

| | | | | |
|---|---|---|---|---|
| 2009/0157481 A1* | 6/2009 | Jung | ................ | A61B 5/0476 |
| | | | | 709/205 |
| 2009/0164401 A1* | 6/2009 | Jung | ................ | G06Q 30/02 |
| | | | | 706/45 |
| 2010/0302000 A1* | 12/2010 | Szymkowiak | ........ | C04B 41/009 |
| | | | | 340/5.82 |
| 2012/0182211 A1* | 7/2012 | Griffin | ................ | G09G 5/26 |
| | | | | 345/156 |
| 2013/0024918 A1* | 1/2013 | Cramer | ............ | H04L 63/0838 |
| | | | | 726/6 |
| 2013/0099928 A1* | 4/2013 | Daly | ............ | G07C 9/00103 |
| | | | | 340/573.1 |

OTHER PUBLICATIONS

Hodgkins, Kelly; "Apple Researching Automatic Mood Assessment for Targeted Ad Delivery." http://www.macrumors.com/2014/01/23/mood-based-ad-delivery/. MacRumors, Jan. 23, 2014.

Winkler, Rolfe; Wakabayashi, Daisuke; Dwoskin, Elizabeth; "Apple Buys Artificial-Intelligence Startup Emotient." http://www.wsj.com/articles/apple-buys-articial-intelligence-startup-emotient-1452188715. Wall Street Journal, Jan. 7, 2016.

Bark, FAQ, Internet Webpage accessed on May 25, 2017, https://www.bark.us/faq.

Bark, How It Works, Internet Webpage accessed on May 25, 2017, https://www.bark.us/how.

* cited by examiner

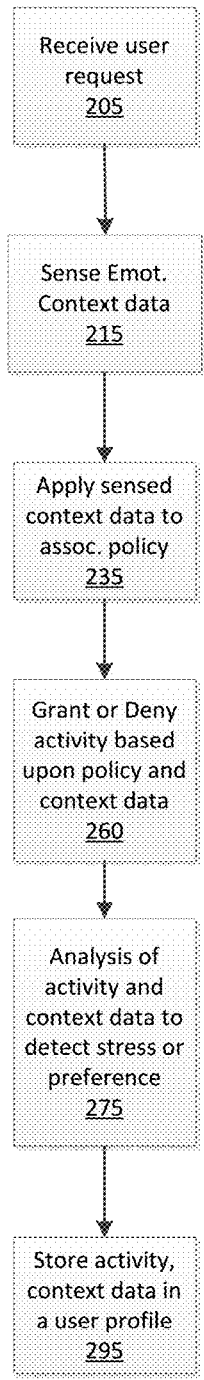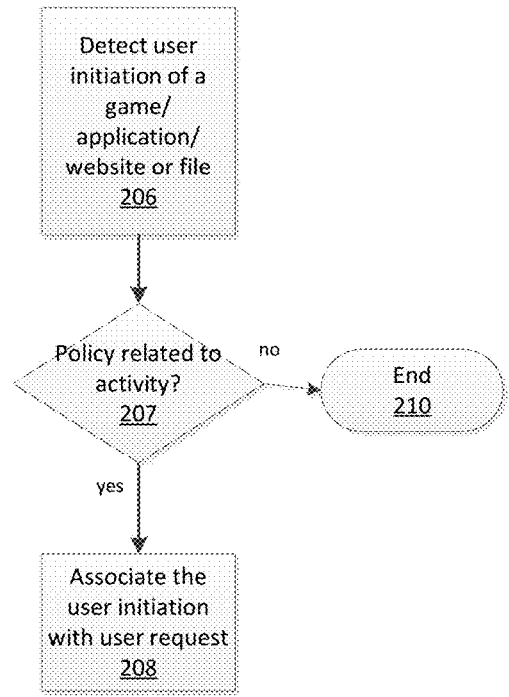
FIG. 2A
FIG. 2B

SYSTEMS AND METHODS OF ADMINISTERING COMPUTER ACTIVITIES BASED UPON EMOTIONAL INTELLIGENCE

BACKGROUND

Cloud computing provides shared processing resources and data to computers and other devices on demand using the Internet. In particular, on-demand access to a shared pool of configurable computing resources (e.g., networks, servers, storage, applications and services), may be provided rapidly with minimal effort. As a result, cloud computing is commonly referred to as a "virtual reality place," where people perform their virtual activities including exchanging messages, learning, relaxing, entertaining, and the like. Scenarios exist where some of these activities may be controlled and managed by "super users" or administrators. For example, system administrators in enterprise environments may enforce security policies that may grant or deny access to files and websites. In parental control systems, parents can monitor a child's on-line activities. These parental controls can fall into roughly four categories. First, these controls may limit access based upon usage, where the usage of a device may be constrained by placing time-limits on usage or forbidding certain types of usage. Second, these controls may comprise content filters, which limit access to inappropriate content based upon the user's age. Further, these controls may include monitoring the activity based upon the location of the user. Finally, designation of a particular type of software may be limited or the user's activities may be confined to a specific software manufacturer. In the alternative.

In general, such administration is confined to restricting or limiting certain activities, which are in violation of rules set forth by the administrator in the form of policies. For example, a policy may be set that enterprise employees may not visit pornographic websites. Another rule may limit the use of the computer for persons under the age of 18 beyond a curfew or a predetermined range of time. Accordingly, most on-line parental control systems are more about controlling access; rather, than parenting a child with the mindset towards determining what is in the best interests of the child. For example, when a child struggles with a math assignment or becomes overly excited while playing a violent videogame, there is no system that automatically provides parental guidance, accounting for the impact of the computer activity upon the child or user. Further, when the child states that he is using the computer to perform one computer activity (e.g. homework) and, yet in actuality is performing another activity (e g gaming), there exists no system that detects and/or corrects this type of behavior. In general, there exists no parental control system or security system that accounts for the impact of the computer activity upon the user when administering control of the computing device. It is within this context that the embodiments arise.

SUMMARY

Embodiments of a system and method for administering computer activities based upon emotional context data are provided. It should be appreciated that the present embodiment can be implemented in numerous ways, such as a process, an apparatus, a system, a device, or a method. Several inventive embodiments are described below.

In some embodiments, a system and method for administering computer activities based upon an emotional analysis of the user is provided. One method may include receiving a user request for a computer activity and sensing emotional context data associated with the user, such as voice stress analysis of user communication, eye motion, pupil dilation, mood/stress changes, sporadic user movement, and video contexts indicating micro-expressions (i.e. anxiety, anger, amusement, sadness, pleasure, contempt, and the like). The method may further include retrieving a policy associated with the requested computer activity and applying the sensed emotional context data to the policy as input. In response to a detected policy permission, the method may include enabling full or restricted access to the requested computer activity based upon the sensed emotional context and various other parameters. In the alternative, in response to a detected policy violation, the method may include denying access to the computer activity. The method may further include correlating the computer activity with the emotional context data to detect stress or preference associated with the computer activity. For example, if the system detects a negative micro-expression in the captured video context data, the system may classify the activity as "stressful," and modify a corresponding policy, accordingly. The method may also include reporting the detected data to a third party in exchange for feedback, which may be used to adjust any administration policies. Thereby, the systems described herein enable parental or third party controls to be established using emotional intelligence.

In some embodiments, a computing system that administers activity based upon emotional intelligence is provided. The computing system may include a processor coupled to a memory to execute an emotional analysis control scheme using an emotional analysis agent; wherein, the processor is operable to receive a user request for a computer activity and sensed emotional context data associated with the user. For example, the processor may retrieve voice stress analysis of user communications or capture video contexts using a web camera to detect a variety of micro-expressions including amusement, contempt, embarrassment, anxiety, anger, anxiety, and the like. Further, the processor may be operable to detect eye motion, pupil dilation, and/or mood and stress changes, such as sensing kinetic attributes including heart rate, perspiration rate, body temperature, adrenaline level, body oxygen level, and the like. The processor may also be operable to detect sporadic user movement associated with stress. Further, the processor may be operable to package all the data detected, including the voice stress analysis data, video context, eye motion, pupil dilation, sporadic user movement, mood and stress changes to form the emotional context data. Once the emotional context data is derived, the processor may be operable to apply the sensed emotional context data to a policy associated with the computer activity in an effort to detect policy permission or a policy violation. In response to a detected policy permission, the processor may be operable to enable full or restricted access to the computer activity. In the alternative, the processor may be operable to deny access to the computer activity in response to a detected policy violation. Further, the processor may be operable to correlate the computer activity with the emotional context data to detect user stress or user preference associated with the computer activity. For example, when the processor detects a negative micro-expression in captured video context data, the processor may be operable to classify the activity as "stressful" and modify a corresponding policy accordingly. The processor may be operable to report the sensed emotional context data a third party in a user-friendly format, in exchange for feedback, which may be used to adjust any administration policies. Accordingly, a third party (such as a parent or system administrator) can modify the user policies that are administered in cooperation with the processor.

In some embodiments, a tangible, non-transitory, computer-readable media having instructions whereupon which, when executed by a processor, cause the processor to perform the administration of a computer activity based upon an emotional intelligent method described herein. One emotional intelligent method may include receiving a user request for a computer activity and sensing emotional context data associated with the user, such as voice stress analysis of user communication, eye motion, pupil dilation, mood/stress changes, sporadic user movement, and video contexts indicating micro-expressions (i.e. anxiety, anger, amusement, sadness, pleasure, contempt, and the like). The method may further include retrieving a policy associated with the requested computer activity and applying the sensed emotional context data to the policy as input. In response to detected policy permission, the method may include enabling full or restricted access to the requested computer activity based upon the sensed emotional context and various other parameters. In the alternative, in response to a detected policy violation, the method may include denying access to the computer activity. The method may further include correlating the computer activity with the emotional context data to detect stress or preference associated with the computer activity. For example, if the system detects negative micro-expressions in captured video context data, the system may classify the activity as "stressful" and modify a corresponding policy accordingly. The method may include reporting detected data to a third party in exchange for feedback, which may be used to adjust any administration policies. Thereby, the systems described herein enable parental or third party controls to be established using emotional intelligence.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

FIG. 2A is a flow diagram of a method for administering computer activities based upon emotional context data, in some embodiments.

FIG. 2B is a flow diagram of a method for receiving a user request of FIG. 2A, in accordance with some embodiments.

DETAILED DESCRIPTION

Figure 1:
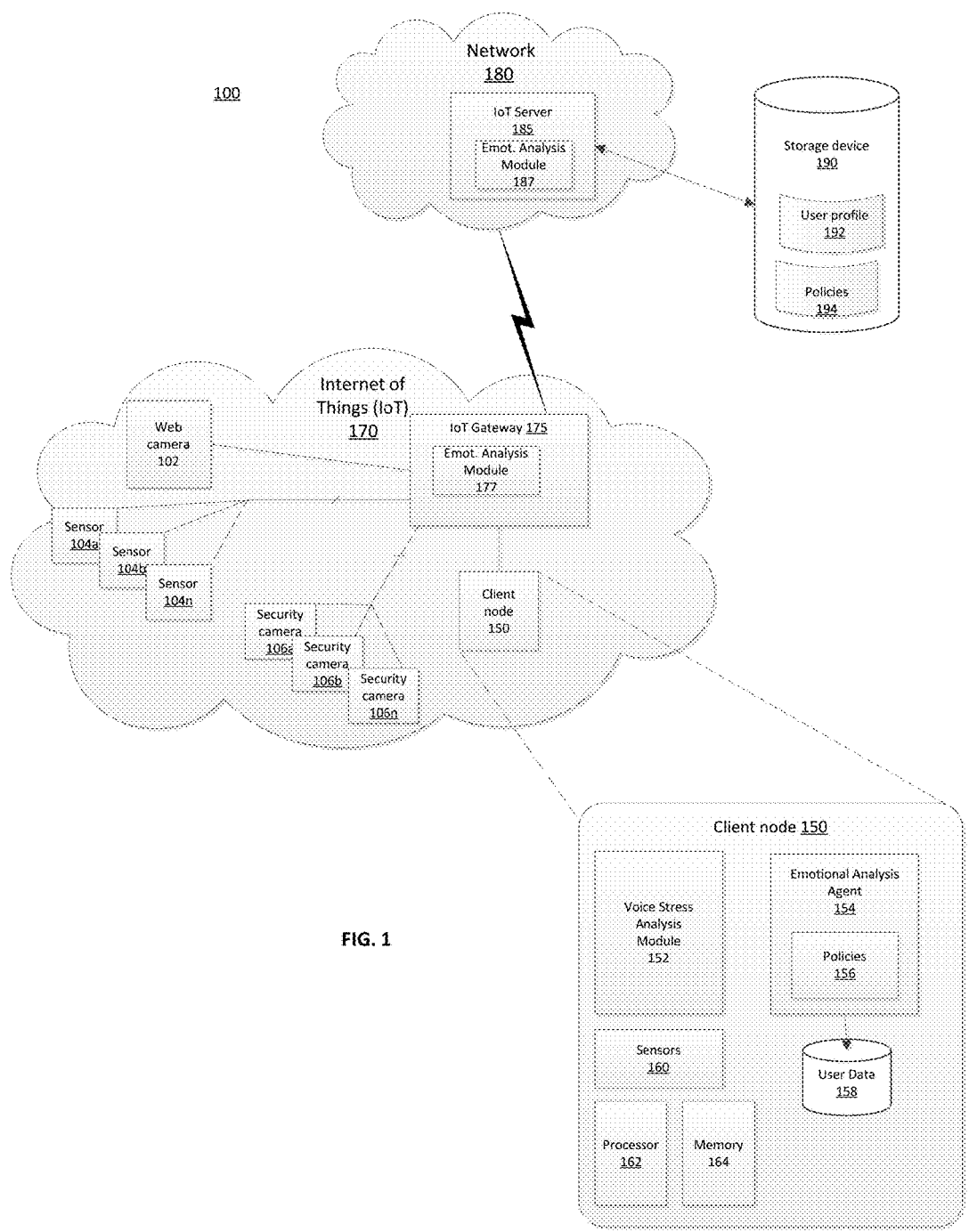
FIG. 1 is a perspective view of an operating environment of a system for administering computer activities using virtualized Internet of Things (IoT) devices to detect emotional context data, in accordance with some embodiments.

The following embodiments describe a system and method for administering computer activities based upon emotional context data. It can be appreciated by one skilled in the art, that the embodiments may be practiced without some or all of these specific details. In other instances, well known process operations have not been described in detail in order not to unnecessarily obscure the embodiments.

Systems and methods of administering computer activities based upon user emotional intelligence are provided. One method may include receiving a user request for a computer activity and sensing emotional context data associated with the user, such as voice stress analysis of user communication, eye motion, pupil dilation, mood/stress changes, sporadic user movement, and video contexts indicating micro-expressions (i.e. anxiety, anger, amusement, sadness, pleasure, contempt, and the like). The method may further include retrieving a policy associated with the requested computer activity and applying the sensed emotional context data to the policy as input. In response to a detected policy permission, the method may include enabling full or restricted access to the requested computer activity based upon the sensed emotional context and various other parameters. In the alternative, in response to a detected policy violation, the method may include denying access to the computer activity. The method may further include correlating the computer activity with the emotional context data to detect stress or preference associated with the computer activity. For example, if the system detects a negative micro-expression in the captured video context data, the system may classify the activity as "stressful," and modify a corresponding policy, accordingly. The method may also include reporting the detected data to a third party in exchange for feedback, which may be used to adjust any administration policies. Thereby, the systems described herein enable parental or third party controls to be established using emotional intelligence.

In previous parent control systems, no attempts have been made to consider the user's natural reaction to select or define activity policies. The systems and methods disclosed herein take advantage of various devices within an Internet of Things (IoT) network that are capable of detecting human reactions, emotions, and mood changes to generate an emotional context, whereby the user access policy may be enforced. For example, voice stress analysis of a user's communication while using video chat or phone calls may be included in the determination of emotional context data to be applied to a policy. Web cameras within the IoT may detect a variety of micro-expressions, such as amusement, contempt, embarrassment, anxiety, guilt, pride, relief, contentment, pleasure, shame, and the like. These same cameras may also track eye motion and pupil dilation. Sensors may be built into the computing device that detect the user's mood and stress changes based upon the monitoring of the voice tone (volume), heart rate, perspiration, body temperature, adrenaline levels, body oxygen levels, and the like. Further, home security cameras may detect sporadic person movements typically associated with stress.

Policies may be applied based upon the emotional output detected. For example, if the system detects that a minor user (child) feels stressed, when doing math, the system may automatically suggest a similar less-stressful activity or differing content based upon previous known emotional context data of either this child or other children (e.g. obtained through crowd-sourcing). In another example, when the system detects that a child likes a particular topic, the system may use this information as input to an existing parental incentive system (where the child is requested to perform certain activities, such as homework, in exchange for activities that the child prefers). The policies may also adjust existing network rules. For example, a third-party, such as a parent may not desire that the child accesses sites that usually cause stress for the child. The embodiments are not limited to detecting stress to trigger changes to network rules, as other emotions may be detected. For example, excitement when viewing certain categories, such as "weapons" may trigger changes to network rules. In some embodiments, the network rules may also restrict site categories or topics as well as sites. For examples, all sites related to "weapons" can be restricted. Additionally, to improve the efficiency of collecting emotional output, the system may be supplemented with sensors that may be installed at the client node or wearable sensor technology (such as a smart watch). Advantageously, the systems and methods disclosed herein are not limited to parental control systems only; these techniques may be applied to employee activities in an enterprise environment (where privacy laws allow). For example, emotional analysis may provide feedback into an agile development process, where tasks may be automatically assigned based upon the detected developer enjoyment of performing a similar task in the past.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, an exemplary embodiment of an operating environment of a system for administering computer activities using virtualized IoT devices to detect emotional context data, in accordance with some embodiments is shown. The operating environment or system 100 includes at least one client node 150, a network 180, an IoT network 170, an IoT gateway 175, at least one IoT server 185, and a database 190. FIG. 1A shows cloud entities that may include the IoT server 185. Although not shown, the cloud entities may comprise other third-party servers, and end-users. Client node 150, with local data store 158, is coupled by IoT gateway 175 to the server 185 having its own emotional analysis module 187.

IoT 170 is the network of physical objects or "things" embedded with electronics, software, sensors and connectivity to enable it to achieve greater value and service by the exchange of data with the manufacturer, operator and/or other connected devices. Each "thing" is uniquely identifiable through its embedded computing system and has the capacity to interoperate within the existing Internet infrastructure. Enterprise IoT platforms that include a wide variety of devices, device capabilities, communication idiosyncrasies and other disparities. In particular, the IoT network 170 may include at least one web camera 102, at least one sensor 104a-n, and at least one security camera 106a-n. System 100 may be configured to provide a unified and standardized communication interface between IoT server 185, client node 150, and IoT devices (102, 104a-n, 106a-n, and 150). The IoT gateway 175 may include an emotional analysis module 177, wherein the detection of user emotional context data may be determined as described below. The IoT server 185 may couple to the storage device 190 for reference to user profiles 192 and policies 194 as described below.

Each client node 150 may include a emotional analysis agent 154, memory 164, a processor 162, at least one sensor 160, and local data store 158. The emotional analysis agent 154 may comprise one or more policies related to computer activities, such as file access, directory access, website access, and game/application access. Although not shown, one or more policies may reside on the IoT gateway 175, as well as the remote storage device 190 (within policy database 194). Client nodes 150 may further include a voice stress analysis module 152 that can be monitored by the emotional analysis agent 154 to detect stress levels based upon current or previous video chat and phone call history as described below. Although not shown, module 152 may be comprised of memory coupled to a processor operable to monitor video chats and phone calls associated with the user in an effort to detect stress levels in the user's voice using a voice recognition utility. The voice recognition utility may be comprised of software, hardware, and/or logic associated with a voice recognition algorithm or process. In various embodiments, the sensors 160 may comprise microphones, speakers, cameras, a thermocouple, a thermometer, a biological sensor, an optical sensor, a chemical sensor, a microsensor, a pressure sensor, a ultrasonic sensor, humidity sensor, motion sensor, an acceleration sensor, a displacement sensor, and the like. These sensors may be located within the client node 150 as shown or may be wired or wirelessly coupled to the client node 150. For example, the user may wear wearable sensors (such as wearable telephonic devices, heart monitor, fashion electronics, tech togs, and the like) that provide input to client node 150. For example, client node 150 may be a portable electronic device that uses long-range wireless communications to communicate with wireless base stations or short-range wireless communications links, such as links for supporting various standard wireless protocol: radio standard, cellular standard 3G, 4G, Wi-Fi® (IEEE 802.11) bands at 2.4 GHz and 5 GHz and the Bluetooth® band at 2.4 GHz. Sensors 160 may couple to sense acoustics, sound, vibration, heart rate, perspiration rate, body temperature, adrenaline level, blood oxygen level, blood pressure, pulse, oxygen saturation, blood glucose, alcohol level, positioning, angle, displacement, distance, speed, acceleration, pressure, heat, temperature, and the like.

In some embodiments, the emotional analysis agent 154 may serve as a device that communicates with the server 185 to perform the method of administering computer activities based upon emotional context data described more in detail below. In other embodiments, the emotional analysis agent 154 having one or more policies 156 may determine within each client node 150 the emotional context data by communication with one or more IoT devices (102, 104a-n, 106a-n), serving as the sole agent that performs the method of computer activity administration based upon emotional context data described herein. The client nodes 150, server 180, and the storage device 190 may reside on the same LAN, or on different LANs that may be coupled together through the Internet, but separated by firewalls, routers, and/or other network devices. In one embodiment, client nodes 150 may couple to network 180 through a mobile communication network. In another embodiment, the client nodes 150, server 180, and the storage device 190 may reside on different networks. In some embodiments, as shown, the IoT server 185 may reside in a cloud network. In various embodiments, the client node 150 may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

The IoT server 185 may comprise a processor (not shown), memory (not shown), and an emotional analysis module 187 having a set of policies. In some embodiments, the emotional analysis system 100 may comprise processing software instructions and/or hardware logic required for emotional analysis according to the embodiments described herein. The IoT server 185 may provide remote cloud storage capabilities for file filters, domain filters, user profiles, and various types of emotional analysis policies, through the storage device 190 coupled by network 180. Further, these may couple to one or more tape-out devices (not shown) or any other secondary datastore. As such, a database of emotional analysis policies may be stored within a local data store, remote disks, secondary data storage devices, or tape-outs devices (not shown). The database may include prior user requests (computer activities), user profiles, prior emotional context data associated with the user, the various versions of policies associated with the user, third-party feedback, timestamps, and the like. In some embodiments, the client node 150 may retrieve previous results relating to a computer activity initially from a remote datastore to a local data store 158. In other embodiments, the database of emotional analysis policies, prior emotional analysis results, emotional context data, and the like may be stored locally on the client node 150 or the server 185. In particular, for remote storage purposes, the local data storage unit 158 can be one or more centralized data repositories having mappings of respective associations between each fragment data and its location within remote storage devices. The local data store may represent a single or multiple data structures (databases, repositories, files, etc.) residing on one or more mass storage devices, such as magnetic or optical storage based disks, tapes or hard drives. This local data store may be an internal component of the IoT gateway 175. In the alternative, the remote data store 190 also may couple externally to server 185 as shown in FIG. 1, or remotely through another network. Further, the IoT server 185 may communicate with the remote storage devices over a public or private network. Although not shown, in various embodiments, the IoT server 185 may be a notebook computer, desktop computer, microprocessor-based or programmable consumer electronics, network appliance, mobile telephone, smart telephone, radio frequency (RF) device, infrared (IR) device, Personal Digital Assistant (PDA), set-top box, an integrated device combining at least two of the preceding devices, and the like.

In operation, emotional analysis agent 154 may monitor when the user attempts to initiate a game or an application. Further, the emotional analysis agent 154 may monitor when the user attempts to open a file or a website. In response to an attempted initiation or file/website opening, the emotional analysis agent 154 may identify whether the particular object, file, game, website, or application is associated with at least one policy. When an association exists between the policy and the computer activity that the user requests exists, the emotional analysis agent 154 will verify that the requested activity is a user request that may be monitored based upon emotional intelligence. Next, the emotional analysis agent 154 may sense the emotional context data associated with the user. For example, emotional analysis agent 154 may retrieve voice stress analysis of the user's communications from the voice stress analysis module 152. Further, a local camera (sensor 160) or a web camera 102 may be used by the emotional analysis agent 154 to capture video context data, in an effort to detect a variety of micro-expressions, including amusement, contempt, embarrassment, anxiety, guilt, pride, relief, contentment, pleasure, shame, and the like. In communication with IoT 170, emotional analysis 154 may also detect eye motion and pupil dilation of the user using the web camera 102 or a local camera (sensors 160) residing at the client node 150. Using the local sensors 160, emotional analysis agent 154 may also detect mood and stress changes by sensing at least voice volume, a heart rate, a perspiration rate, a body temperature, an adrenaline level, or a blood oxygen level. Further, emotional analysis agent 154 may detect sporadic user movement typically associated with stress using a home security camera 106a-n (or sensor 160) and a database of stress-related movements (not shown) located within storage device 158 or 190. In conclusion, the emotional analysis agent 154 may package all sensed data, including voice stress analysis data, video context data, eye motion, pupil dilation, mood and stress change, and sporadic user movement, to form emotional context data. In the alternative, emotional analysis agent 154 may retrieve prior emotional context data associated with the requested computer activity from the remote storage device 190 or the local storage device 158.

There are several ways in which the emotional context data may be processed. First, the emotional analysis agent 154 may retrieve an associated policy from the policy database 156 locally or from the policy database 194 remotely through IoT 170 and network 180. Although not shown, emotional analysis agent 154 may also retrieve an associated policy from the IoT gateway 175. In the alternative, emotional analysis module 177 or 187 may retrieve a policy associated with the requested computer activity for enhanced processing and performance. Once the associated policy is obtained, either agent 154 or module (177 or 187) may apply the sensed emotional context data to the policy in an effort to detect policy permission or policy violation. In response to a detected policy permission, either agent 154 or module (177 or 187) may enable full or restricted access to the requested computer activity. In contrast, when a policy violation is detected, agent 154 or module (177, 187) may deny access to the requested computer activity. Further, emotional analysis agent 154 or module (177, 187) may correlate the computer activity with the emotional context data to detect stress or preference associated with the computer activity. For example, when a user uses a computer activity and mood and stress changes are detected, wherein the heart rate and adrenaline level increases, agent 154 may classify the computer activity as "stressful." Thereby, emotional analysis agent 154 or module (177, 187) may modify current policies associated with the computer activity to recommend optional activities that are less stressful or deny access to the activity. In an attempt to grade the stress levels of a particular computer activity, emotional analysis module 177 (187) may retrieve data obtained through crowd sourcing available to the IoT network 170. In the alternative when the user opens a particular website (e.g. a shopping utility) and the video context captures micro-expression of amusement pleasure and relief, agent 154 or module (177, 187) may classify the computer activity as "preferred." Accordingly, emotional analysis agent 154 or module (177, 187) may modify current policies associated with the website or use this information as input into a parental incentive system, where the user is prompted to perform an activity in exchange for this preferred activity. The emotional analysis module 177 (187) may report the sensed context data to a third-party in exchange for feedback; wherein, the feedback is use to modify one or more policy associated with particular computer activities. For example, emotional analysis module 177 (187) may provide input to a parental control system or directly to the parent, soliciting feedback. Additionally, emotional analysis module 177 (187) can provide emotional intelligence input into an agile development process, where tasks can be automatically assigned based upon the emotional intelligence input provided.

It is appreciated that the components of operating environment 100 are meant to be examples and more or fewer components may be present in various configurations. In addition, the operating environment may be part of a distributed computing environment, a cloud computing environment, a client server environment, and the like. In other words, as would be apparent to one of ordinary skill in the art after reading this description, the various features and functionality described herein may be implemented in the operating environment of a system for administering computer activities using virtualized IoT devices to detect emotional context data using any arrangement of components necessary to perform the detection of emotional context data and other analysis of stress and emotional data (and functionality); and can be implemented in one or more separate or shared modules in various combinations and permutations.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, application specific integrated circuit (ASIC), PLAs, PALs, complex programmable logic device (CPLD), field programmable gate array (FPGA), logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

FIG. 2A is an exemplary flow diagram of a method 200 for administering computer activities based upon emotional context data, in some embodiments. In an action 205, the emotional analysis system 100 may receive or detect a user request associated with a computer activity. For example, as shown in FIG. 2B, which represents a flow diagram for a method for receiving a user request of FIG. 2A, emotional analysis system 100 may detect user initiation of a game or application and opening of a file or website (in an action 206). In response, the system may detect whether a policy exists that is related to the requested computer activity, in a decision action 207. For example, agent 154 may search the database of policies either locally (156) or remotely (194) to find a match between a policy and the requested computer activity. When a match exists, the system can associate the user initiation with a user request that may be processed using emotional intelligence, in an action 208. When no match exists, the process ends in an action 210 and the user request is processed as it typically would be without the advantage of emotional intelligence.

Figure 2C:
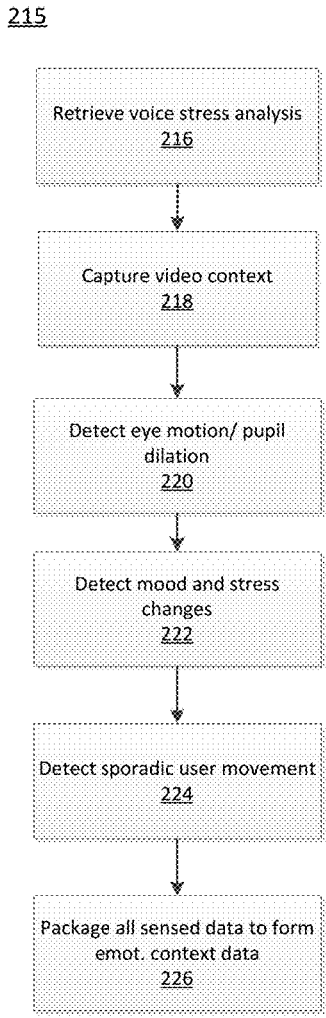
FIG. 2C is a flow diagram of a method for sensing emotional context data of FIG. 2A, in accordance with some embodiments.

In an action 215, the system 100 may sense the emotional context data. For example as shown in FIG. 2C, which represents a flow diagram for a method for sensing emotional context data of FIG. 2A, emotional analysis system 100 may retrieve voice stress analysis data of the user's communications from analysis module 152 (in an action 216). For example, voice stress analysis module 152 may monitor the user's present or prior video chat or phone call to detect accelerated stress levels from the user's voice through voice recognition software hardware and/or logic. Emotional analysis system 100 may also capture a video context associated with the requested computer activity using a web camera 102 to detect a variety of micro-expressions including amusement, contempt, embarrassment, anxiety, guilt, pride, relief, contentment, pleasure, shame, and the like (in an action 218). In an action 220, system 100 may also detect eye motion and pupil dilation using the web camera 102. Further, the system 100 may detect mood and stress changes by sensing at least voice tone (volume), heart rate, perspiration rate, body temperature, adrenaline level, blood oxygen level, and the like using sensors 160, in an action 222. Moreover, system 100, in an action 224, may detect sporadic user movement typically associated with stress using home security cameras 106a-n or motion detectors (not shown); and a database of stress-related movements (not shown) located within storage device 158 or 190. After gathering context data in an action 226, system 100 may package all of the data to form the emotional context data, such that it includes the resultant voice stress data, video context, eye motion, pupil dilation, mood and stress changes, sporadic user movement, and the like.

Figure 2D:
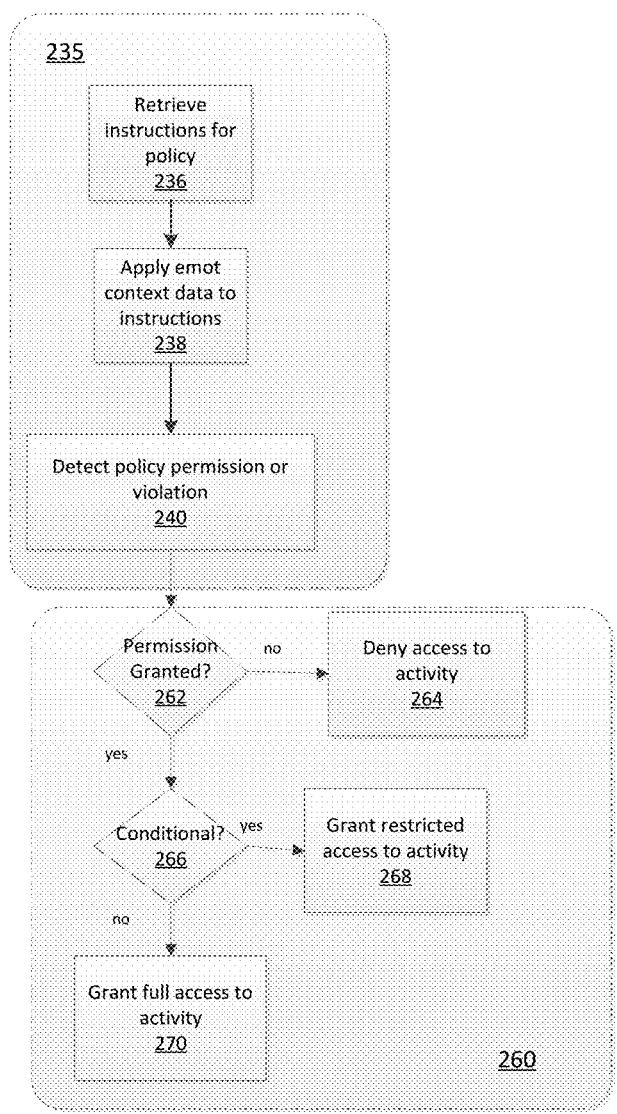
FIG. 2D is a flow diagram of a method for applying sense context data to be associated policy; wherein, the activity is granted or denied based upon the policy and context data of FIG. 2A, in accordance with some embodiments.

Referring back to FIG. 2A, in an action 235, system 100 may apply the sensed context data to the associated policy. As a result, the system 100, in an action 260 may grant or deny the requested activity based upon the emotional context data as it applies to the associated policy. For example, as shown in FIG. 2D, which represents a flow diagram for a method for applying sense context data to be associated policy; wherein, the activity is granted or denied based upon the policy and context data of FIG. 2A, the system 100 may retrieve instructions associated with the policy in an action 236. The system 100 may apply the emotional context data to the instructions, in an action 238. Further, the system 100, in an action 240, may detect a policy permission or policy violation. In particular, system 100 may detect whether policy permission has been granted, in a decision action 262. When the permission has not been granted, the requested activity is denied in an action 264. When the permission has been granted, the system can determine whether the permission granted should be restricted or given conditional access, in decision action 266. When the permission is conditional, in an action 268 the system 100 can grant the user restricted access to the activity based upon the parameters defined within the associated policy. When the permission granted is not conditional, the system 100 can grant full access to the computer activity in an action 270.

Figure 2E:
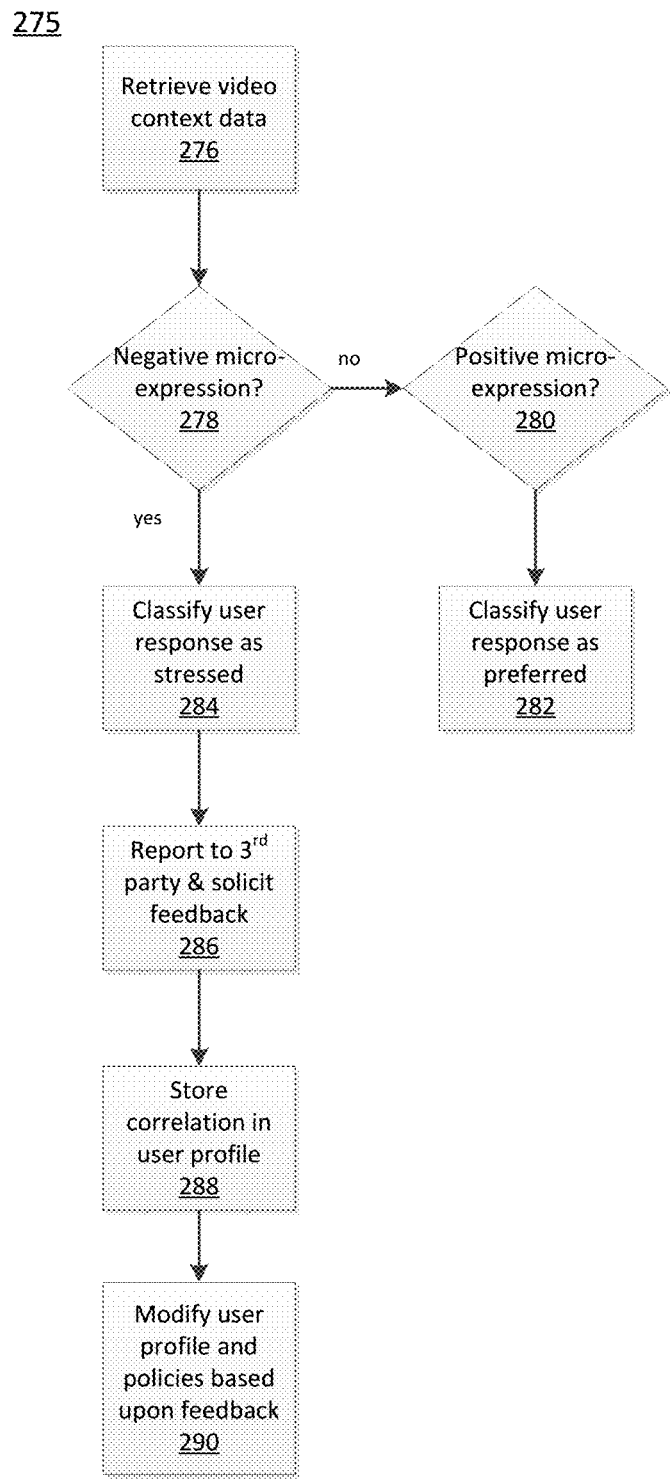
FIG. 2E is a flow diagram of a method for analyzing the activity and context data to detect stress or a preferred computer activity of FIG. 2A, in accordance with some embodiments.

Referring back to FIG. 2A, the system 100 may perform an analysis of the requested computer activity and the emotional context data to detect whether the activity is associated with stress or the user has a preference for the activity in an action 275. For example, as shown in FIG. 2E, which represents a flow diagram for a method for analyzing the activity and context data to detect stress or a preferred computer activity as shown in FIG. 2A, the system 100 may retrieve the video context data (in action 276). Accordingly, the system 100 may detect whether a negative micro-expression exists in decision action 278. When no negative micro-expression exists, the system may detect whether a positive micro-expression exists in a decision action 280. When a positive micro-expression exists, such as pleasure, amusement, contentment, and the like, this system 100 can classify the user response as "preferred," in an action 282. When a negative micro-expression exists, such as anger, contempt, anxiety, embarrassment, and the like, system 100 may classify the user's response as "stressed," in an action 284. In an action 286, system 100 may report to a third-party the detected user response, user request, and associated policy in an effort to solicit feedback. The system 100 may store this user response correlation in a user profile, in an action 288. Further, the system, in an action 290, may modify the associated user profile and/or policies based upon the solicited feedback. Moreover, although not shown, system 100 may recommend a less stressful computer activity when a negative micro-expression exists. For example, when a minor user (child) has been detected to feel stress when performing a math utility, the system 100 may suggest a less stressful activity or content automatically based on previously known reactions of this user or other users of the same age range possibly obtained through crowdsourcing retrieved by IoT gateway 175. As another example, if the system detects that the child prefers a particular topic, the reporting of this to a parent may give the parent the opportunity to incorporate this knowledge in a parental incentive system (where the child is requested to perform certain activities, such as homework, in exchange for other preferred activities). The adjusted policies may also adjust existing network rules. For example, a particular user may be denied access to sites that caused him stress or are known to be troublesome (e.g. weaponry, sexual immorality, and the like). In contrast, the feedback may be used to adjust policies relating to development process assignment rules that assign tasks, which the developer enjoys. Further, referring back to FIG. 2A, in an action 295, the emotional analysis system 100 may store the requested activity and its associated emotional context data (with a timestamp) in a user profile to be used in the analysis performed at action 275.

Figure 3:
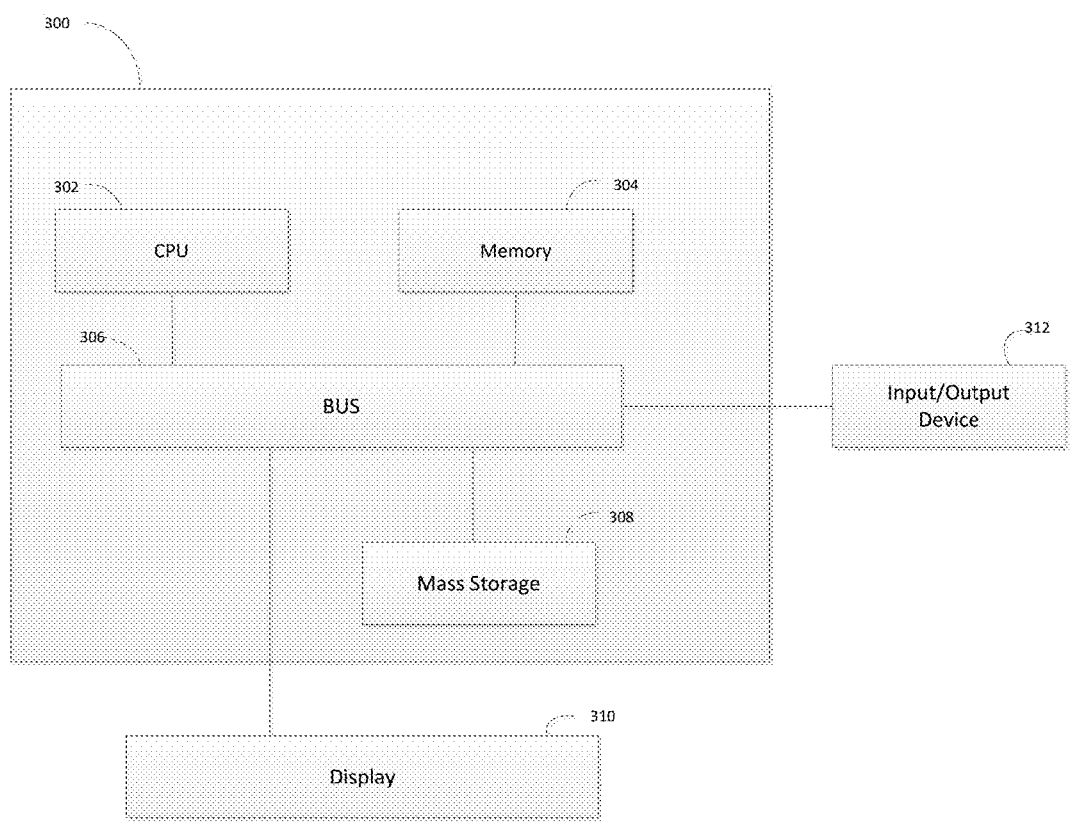
FIG. 3 is an illustration showing an exemplary computing device which may implement the embodiments described herein.

It should be appreciated that the methods described herein may be performed with a digital processing system, such as a conventional, general-purpose computer system. Special) purpose computers, which are designed or programmed to perform only one function may be used in the alternative. FIG. 3 is an illustration showing an exemplary computing device which may implement the embodiments described herein. The computing device of FIG. 3 may be used to perform embodiments of the functionality for performing the computer activity administration based upon emotional intelligence in accordance with some embodiments. The computing device includes a central processing unit (CPU) 302, which is coupled through a bus 306 to a memory 304, and mass storage device 308. Mass storage device 308 represents a persistent data storage device such as a floppy disc drive or a fixed disc drive, which may be local or remote in some embodiments. The mass storage device 308 could implement a backup storage, in some embodiments. Memory 304 may include read only memory, random access memory, etc. Applications resident on the computing device may be stored on or accessed through a computer readable medium such as memory 304 or mass storage device 308 in some embodiments. Applications may also be in the form of modulated electronic signals modulated accessed through a network modem or other network interface of the computing device. It should be appreciated that CPU 302 may be embodied in a general-purpose processor, a special purpose processor, or a specially programmed logic device in some embodiments.

Display 312 is in communication with CPU 302, memory 304, and mass storage device 308, through bus 306. Display 312 is configured to display any visualization tools or reports associated with the system described herein. Input/output device 310 is coupled to bus 306 in order to communicate information in command selections to CPU 302. It should be appreciated that data to and from external devices may be communicated through the input/output device 310. CPU 302 can be defined to execute the functionality described herein to enable the functionality described with reference to FIGS. 1-2E. The code embodying this functionality may be stored within memory 304 or mass storage device 308 for execution by a processor such as CPU 302 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of administering computer activities comprising:
    receiving, at a computer system, a user request for a computer activity;
    sensing, in real-time, emotional context data associated with the user by way of a biometric sensor, camera, microphone, or combination thereof coupled to the computer system;
    applying, by the computer system, the sensed emotional context data to a policy associated with the computer activity to detect policy permission or policy violation;
    adjusting, by the computer system, a level of access to the computer activity based on applying the sensed emotional context data to the policy; and
    automatically modifying the policy based in part on adjusting the level of access.

2. The method of claim 1, wherein receiving user request further comprises:
    detecting an attempted user initiation of a game or an application; detecting an attempted user opening of a website or file;
    identifying, in response to the attempted initiation or opening, whether the game, the website, the file, or the application is associated with at least one policy; and
    verifying, in response to the identified association, to the attempted initiation or opening as the user request.

3. The method of claim 1, wherein sensing emotional context by way of the biometric receiver, camera, microphone, or combination thereof further comprises:
    retrieving voice stress analysis of user communications;
    capturing video context using the camera to detect a variety of micro-expressions including amusement, contempt, embarrassment, anxiety, guilt, pride, relief, contentment, pleasure, and shame;
    detecting eye motion using the camera;
    detecting pupil dilation using the camera;
    detecting mood and stress changes by sensing at least a heart rate, a perspiration rate, a body temperature, an adrenaline level, or a blood oxygen level using the biometric sensor; and
    detecting sporadic user movement associated with stress using the camera or a motion detector; and
    packaging the voice stress analysis, the video context, the eye motion, the pupil dilation, the mood and stress changes, and the sporadic user movement to form the emotional context data.

4. The method of claim 1, wherein applying sensed emotional context data further comprises:
    processing a set of instructions associated with the policy using the sensed emotional context;
    generating, in response to the processed instruction approval, the policy permission with full access;
    generating, in response to the processed instruction conditional approval, the policy permission with restricted access; and
    generating, in response to the processed instruction denial, the policy violation.

5. The method of claim 1, wherein correlating computer activity with emotional context data further comprises:
    detecting whether a sensed negative micro-expression exists that includes anxiety, pride, contempt, or anger;
    classifying, in response to the sensed negative micro-expression, a user response to the computer activity as stressed;
    detecting whether a sensed positive micro-expression exists that includes amusement, relief, contentment, or pleasure; and
    classifying, in response to the sensed positive micro-expression, the user response to the computer activity as preferred.

6. The method of claim 1, further comprising:
    storing the correlation between the computer activity and the emotional context in a database associated with the user.

7. The method of claim 1, further comprising:
    reporting the correlation between the computer activity and the emotional context to a parent of a minor user;
    soliciting feedback from the parent; and
    modifying a user profile and a corresponding set of policies based upon the solicited feedback and prior user computer activity.

8. A computing system comprising:
    a memory; and
    a processor operable to:
        receive, at a computer system, a user request for a computer activity;
        sense, in real-time, emotional context data associated with the user by way of a biometric sensor, camera, microphone, or combination thereof coupled to the computer system;

apply, by the computer system, the sensed emotional context data to a policy associated with the computer activity to detect policy permission or policy violation;

adjust, by the computer system, a level of access to the computer activity based on applying the sensed emotional context data to the policy; and automatically modify the policy based in part on adjusting the level of access.

9. The controller of claim 8, wherein the processor, for receiving user request, is further operable to:

detect an attempted user initiation of a game or an application; detect an attempted user opening of a website or file;

identify, in response to the attempted initiation or opening, whether the game, the website, the file, or the application is associated with at least one policy; and verify, in response to the identified association, to the attempted initiation or opening as the user request.

10. The controller of claim 8, wherein the processor, for sensing emotional context, is further operable to:

retrieve voice stress analysis of user communications;

capture video context using the camera to detect a variety of micro-expressions including amusement, contempt, embarrassment, anxiety, guilt, pride, relief, contentment, pleasure, and shame;

detect eye motion using the camera;

detect pupil dilation using the camera;

detect mood and stress changes by sensing at least a heart rate, a perspiration rate, a body temperature, an adrenaline level, or a blood oxygen level using the biometric sensor; and detect sporadic user movement associated with stress using the camera or a motion detector; and package the voice stress analysis, the video context, the eye motion, the pupil dilation, the mood and stress changes, and the sporadic user movement to form the emotional context data.

11. The controller of claim 8, wherein the processor, for applying sensed emotional context data, is further operable to:

process a set of instructions associated with the policy using the sensed emotional context;

generate, in response to the processed instruction approval, the policy permission with full access;

generate, in response to the processed instruction conditional approval, the policy permission with restricted access; and generate, in response to the processed instruction denial, the policy violation.

12. The controller of claim 8, wherein the processor, for correlating computer activity with emotional context data, is further operable to:

detect whether a sensed negative micro-expression exists that includes anxiety, pride, contempt, or anger;

classify, in response to the sensed negative micro-expression, a user response to the computer activity as stressed;

detect whether a sensed positive micro-expression exists that includes amusement, relief, contentment, or pleasure; and classify, in response to the sensed positive micro-expression, the user response to the computer activity as preferred.

13. The controller of claim 8, wherein the processor is further operable to:

store the correlation between the computer activity and the emotional context in a database associated with the user.

14. The controller of claim 8, wherein the processor is further operable to:

report the correlation between the computer activity and the emotional context to a parent of a minor user;

solicit feedback from the parent; and modify a user profile and a corresponding set of policies based upon the solicited feedback and prior user computer activity.

15. A non-transitory computer-readable medium including code for performing a method, the method comprising:

receiving, at a computer system, a user request for a computer activity;

sensing, in real-time, emotional context data associated with the user by way of a biometric sensor, camera, microphone, or combination thereof coupled to the computer system;

applying, by the computer system, the sensed emotional context data to a policy associated with the computer activity to detect policy permission or policy violation;

adjusting, by the computer system, a level of access to the computer activity based on applying the sensed emotional context data to the policy; and automatically modifying the policy based in part on adjusting the level of access.

16. The computer-readable medium of claim 15, wherein receiving user request further comprises:

detecting an attempted user initiation of a game or an application;

detecting an attempted user opening of a website or file;

identifying, in response to the attempted initiation or opening, whether the game, the website, the file, or the application is associated with at least one policy; and verifying, in response to the identified association, to the attempted initiation or opening as the user request.

17. The computer-readable medium of claim 15, wherein sensing emotional context further comprises:

retrieving voice stress analysis of user communications;

capturing video context using the camera to detect a variety of micro-expressions including amusement, contempt, embarrassment, anxiety, guilt, pride, relief, contentment, pleasure, and shame;

detecting eye motion using the camera;

detecting pupil dilation using the camera;

detecting mood and stress changes by sensing at least a heart rate, a perspiration rate, a body temperature, an adrenaline level, or a blood oxygen level using the biometric sensor; and detecting sporadic user movement associated with stress using the camera or a motion detector; and packaging the voice stress analysis, the video context, the eye motion, the pupil dilation, the mood and stress changes, and the sporadic user movement to form the emotional context data.

18. The computer-readable medium of claim 15, wherein applying sensed emotional context data further comprises:

processing a set of instructions associated with the policy using the sensed emotional context;

generating, in response to the processed instruction approval, the policy permission with full access;

generating, in response to the processed instruction conditional approval, the policy permission with restricted access; and generating, in response to the processed instruction denial, the policy violation.

19. The computer-readable medium of claim 15, wherein correlating computer activity with emotional context data further comprises:
- detecting whether a sensed negative micro-expression exists that includes anxiety, pride, contempt, or anger;
- classifying, in response to the sensed negative micro-expression, a user response to the computer activity as stressed;
- detecting whether a sensed positive micro-expression exists that includes amusement, relief, contentment, or pleasure; and
- classifying, in response to the sensed positive micro-expression, the user response to the computer activity as preferred.

20. The computer-readable medium of claim 15, wherein the method further comprises:
- reporting the correlation between the computer activity and the emotional context to a parent of a minor user;
- soliciting feedback from the parent; and
- modifying a user profile and a corresponding set of policies based upon the solicited feedback and prior user computer activity.

* * * * *